A. BOTT.
CLOSING DEVICE FOR PRESERVE POTS.
APPLICATION FILED MAY 20, 1919.
1,402,916. Patented Jan. 10, 1922.
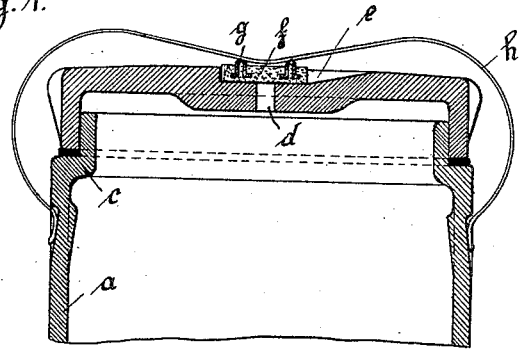
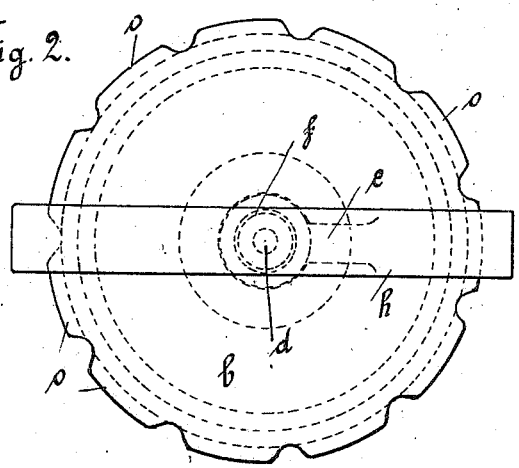
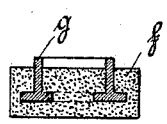
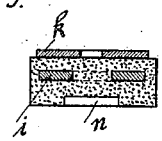
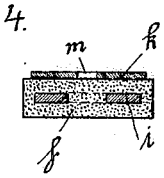
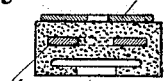

UNITED STATES PATENT OFFICE.

ANTON BOTT, OF FRANKFORT-ON-THE-MAIN, GERMANY, ASSIGNOR TO SOCIÉTÉ ANONYME COMPAGNIE-GÉNÉRALE DU VERRE, OF LUXEMBURG, LUXEMBURG.

CLOSING DEVICE FOR PRESERVE POTS.

1,402,916.   Specification of Letters Patent.   Patented Jan. 10, 1922.

Application filed May 20, 1919. Serial No. 298,571.

*To all whom it may concern:*

Be it known that I, ANTON BOTT, manufacturer, a citizen of the State of Germany, and residing at Frankfort-on-the-Main, Waldschmidtstr. 49, Germany, have invented certain new and useful Improvements in or Relating to a Closing Device for Preserve Pots, of which the following is a specification.

In preserve pots kept closed by exterior atmospheric pressure there exists the inconvenience that the packing inserted between the lid and the glass is generally destroyed as the pot is opened and further that the cover can but with difficulty be lifted. In order to avoid this drawback it has already been suggested to dispose an opening in the cover of the vessel or in the vessel itself and to close the same by a washer or a plug; the closing washer being removed or pierced the air enters into the vessel and thus the cover may be lifted without damaging the outer packing ring. In the known devices simply rubber washers or the like or rubber washers with metal plates laid upon are used. In this case no small openings are admissible in the vessel as otherwise the washers are not sufficiently tightly pressed against and easily separated from the vessel. With a pretty wide opening in the vessel the washer is sucked into the same and its circumference being lifted the packing surface is thus decreased and easily gets untight.

The present invention avoids this inconvenience by providing a stiffening insertion such as metal, glass and the like in the washer consisting of a soft material such as India rubber or the like. The most convenient insertion is a ring the section of which is characterized by a web surmounting the packing material and serving at the same time as a rest to the closing bow during the boiling process.

The drawing shows five different forms of execution of the invention, namely

Fig. 1 is a section through a preserve pot with a washer of the first form,

Fig. 2 is a horizontal projection of Fig. 1,

Figs. 3 to 6 are the sections of four other forms of the washer.

In the Figures 1 and 2 $a$ is the preserve pot, upon which the cover $b$ is mounted, a packing ring $c$ of rubber or the like being inserted between $a$ and $b$. A hole $d$ is disposed in the cover and a notch is provided above the hole into which the washer is inserted. In order to get under the same a bevel groove $e$ running from the cover surface to the bottom of the notch and being of the width of a finger is disposed. Thus a finger may be introduced and take off the washer. The washer consists of a body $f$ of soft packing material—the best material would be india rubber—in which a stiffening insertion $g$ is embedded. According to Fig. 1 this stiffening insertion is a ring of T-shaped section. In the form shown the ring is made of pressed sheet material. The middle web of the T surmounts the packing material so that the closing bow $h$ laid upon the vessel in the known way and pressing the cover against the glass may rest on the ring $g$ made of metal, glass or the like, whereby a sticking together of the bow and the soft material $f$ is prevented. Of course instead of stiffening rings of pressed sheet material also full-sectioned T-shaped rings may be used as shown in Fig. 3 and the T-shaped section may also with the same effect be replaced by other sections such as angles, U-shape etc. i. e. every shape with a web surmounting the packing material.

If the advantage afforded by the web surmounting the packing material can be foregone a simple flat ring $i$ as shown in Fig. 4 can be used. In such case it is recommendable to provide a washer of metal or the like with a hole $m$ in order to prevent the bow from sticking to the packing ring. This hole $m$ and the annular shape of the stiffening insertion admit the washer to be pierced by means of a needle when the preserve pot is to be opened. The form according to Fig. 5 differs from the above-described only by a circular recess $n$ disposed on the inferior surface of the washer. An advantage is thus obtained which consists in the pressure between the washer and the glass being correspondent to the diameter of the recess n independently from the size of the hole in the preserve pot.

In order further to raise the pressure between the washer and the preserve pot the recess n may be enlarged in its upper part as shown in Fig. 6.

For the purpose of heating the preserve pot is put together in the manner shown in Fig. 1, the boiling being performed in the usual way. When the vessel is to be opened the washer is either pierced by means of a needle or lifted by means of a finger or a knife whereupon the cover is easily separated from the glass.

When using artificial rubber as a packing ring c the cover and the vessel sometimes stick together. In order to lift the cover more easily the same is provided with cams or ribs o round its circumference which permit to seize the cover with greater facility when lifting it.

Having thus described my invention, what I claim is:—

1. A closing device for closing an opening in a preserve pot comprising a vessel and a cover closed by exterior atmospheric pressure, consisting of a washer being made of packing material such as india rubber or the like and being provided with a stiffening insertion of stiff material said stiffening insertion having the form of a ring.

2. A closing device for closing an opening in a preserve pot comprising a vessel and a cover closed by exterior atmospheric pressure, consisting of a washer being made of packing material such as india rubber or the like and being provided with a stiffening insertion of stiff material said stiffening insertion having the form of a ring with a web surmounting the packing material.

3. A closing device for closing an opening in a preserve pot comprising a vessel and a cover closed by exterior atmospheric pressure, consisting of a washer being made of packing material such as india rubber or the like and being provided with a stiffening insertion of stiff material said stiffening insertion having the form of a ring the section of the ring being T-shaped.

4. A closing device for closing an opening in a preserve pot comprising a vessel and a cover closed by exterior atmospheric pressure, consisting of a washer being made of packing material such as india rubber or the like and being provided with a stiffening insertion of stiff material said stiffening insertion having the form of a ring the section of the ring being T-shaped and pressed of sheet material.

5. A closing device for closing an opening in a preserve pot comprising a vessel and a cover closed by exterior atmospheric pressure, consisting of a washer being made of packing material such as india rubber or the like and being provided with a stiffening insertion of stiff material said washer having a recess on its packing surface whereby it is made to rest on the pot upon a circular surface.

6. A closing device for closing an opening in a preserve pot comprising a vessel and a cover closed by exterior atmospheric pressure, consisting of a washer being made of packing material such as india rubber or the like and being provided with a stiffening insertion of stiff material having a recess on its packing surface whereby it is made to rest on the pot upon a circular surface the recess being enlarged in its upper part.

7. In a preserve pot combination a vessel and a cover kept closed by exterior atmospheric pressure and provided with a hole to be closed by a washer or the like, said washer being inserted into a notch from the bottom of which a bevel groove extends to the surface of the pot in order to allow the washer to be lifted with greater facility.

8. In a preserve pot in combination a vessel and a cover kept closed by exterior atmospheric pressure and provided with a hole to be closed by a washer or the like, said washer being inserted into a notch from the bottom of which a bevel groove extends to the surface of the pot in order to allow the washer to be lifted with greater facility, said groove having the width of a finger.

9. In a preserve pot a cover provided with a hole to be closed by a washer or the like, said washer being inserted into a notch from the bottom of which a bevel groove extends to the surface of the pot in order to allow the washer to be lifted with greater facility.

10. A preserve pot comprising a vessel and a cover kept closed by atmospheric pressure, a washer of packing material provided with a stiffening insertion, said cover being provided with cams or ribs round its circumference in order to allow the same to be lifted with greater facility said washer being mounted on the cover.

11. In a preserve pot in combination a vessel and a cover kept closed by exterior atmospheric pressure and provided with a hole to be closed by a washer or the like, said washer being made of packing material such as india rubber or the like and being provided with a stiffening insertion made of stiff material and being inserted into a notch from the bottom of which a bevel groove extends to the surface of the pot in order to allow the washer to be lifted with greater facility.

12. In a preserve pot in combination a vessel and a cover kept closed by exterior atmospheric pressure and provided with a hole to be closed by a washer or the like, said washer being made of packing material such as india rubber or the like and being provided with a stiffening insertion made of stiff material and being inserted into a notch from the bottom of which a bevel groove extends to the surface of the pot in order to allow the washer to be lifted with greater facility and said cover being provided with cams or ribs round its circumference in order to allow the same to be lifted with greater facility.

In testimony whereof I have affixed my signature in the presence of two witnesses.

ANTON BOTT.

Witnesses:
GENNER GROCH,
E. ROHDE.